(12) United States Patent
Fatica et al.

(10) Patent No.: US 7,158,477 B2
(45) Date of Patent: Jan. 2, 2007

(54) DATA COMMUNICATION APPARATUS WITH DISTRIBUTED TRAFFIC PROTECTION SWITCHING SYSTEM

(75) Inventors: Dino B. Fatica, Nepean (CA); Pierre Coll, Hull (CA)

(73) Assignee: Nortel Networks Limited, St. Laurent (CA)

( * ) Notice: Subject to any disclaimer, the term of this patent is extended or adjusted under 35 U.S.C. 154(b) by 898 days.

(21) Appl. No.: 10/079,915

(22) Filed: Feb. 22, 2002

(65) Prior Publication Data

US 2003/0120755 A1   Jun. 26, 2003

(30) Foreign Application Priority Data

Dec. 20, 2001   (CA) ..................................... 2365752

(51) Int. Cl.
  *H04J 1/16*   (2006.01)
(52) U.S. Cl. .................. 370/216; 370/242; 398/17; 714/2
(58) Field of Classification Search ........ 370/216–228, 370/241–244, 248, 252; 398/2, 59, 9, 14, 398/50, 45, 10, 17; 385/16, 24; 710/62; 714/2
See application file for complete search history.

(56) References Cited

U.S. PATENT DOCUMENTS

| 5,069,521 | A | | 12/1991 | Hardwick ..................... 385/24 |
| 5,327,275 | A | * | 7/1994 | Yamane et al. ................ 398/2 |
| 6,295,146 | B1 | * | 9/2001 | Nathan et al. ................ 398/50 |
| 6,813,241 | B1 | * | 11/2004 | Wang et al. ................ 370/228 |
| 6,882,765 | B1 | * | 4/2005 | Erickson et al. .............. 385/16 |

FOREIGN PATENT DOCUMENTS

EP   0 579 029 A2   1/1994

OTHER PUBLICATIONS

European Search Report EP 02 25 8928; Mar. 26, 2003.

* cited by examiner

*Primary Examiner*—John Pezzlo
(74) *Attorney, Agent, or Firm*—Jeffrey M. Measures; Borden Ladner Gervais LLP

(57) ABSTRACT

A data communication apparatus having a plurality of working ports for exchanging data traffic with network elements and a plurality of protection ports. The data communication apparatus further includes at least one protection switching functional element operative to perform a plurality of protection switching processes in parallel for switching data traffic from failed working ports to respective protection ports.

22 Claims, 2 Drawing Sheets

DATA COMMUNICATION APPARATUS WITH DISTRIBUTED TRAFFIC PROTECTION SWITCHING SYSTEM

FIELD OF THE INVENTION

The invention relates to the field of protection switching, in particular to devices and methods for providing a protection switching scheme of distributed nature for use in a data communication apparatus.

BACKGROUND OF THE INVENTION

A typical data communication apparatus that exchanges data traffic with network elements has working ports normally used to handle the data traffic and protection ports to which the data traffic can be switched if one or more of the working ports fail. Protection switching is handled by a traffic protection arbiter which receives a protection switch request, evaluates its priority, determines if protection may proceed based on network and local conditions, negotiates protection switching with the affected network elements and coordinates the movement of data traffic.

However, if more than one of the working ports fail simultaneously, the protection arbiter must address all the failures sequentially. This delays a protection switching response, which is undesirable.

Against this background, there exists a need to provide novel methods and devices to provide faster protection switching.

SUMMARY OF THE INVENTION

In a first broad aspect, the invention provides a data communication apparatus having a plurality of working ports for exchanging data traffic with network elements. The data communication apparatus also has a plurality of protection ports. The data communication apparatus further includes at least one protection switching functional element operative to perform a plurality of protection switching processes in parallel for switching data traffic from several failed working ports to respective protection ports.

Advantageously, the invention allows a reduction of the time required to effect protection switching when failures occur at several working ports at the same time or at about the same time. The protection switching functional element can effect protection switching on several failed working ports in parallel which takes less time by comparison to the sequential approach used in prior art devices.

In a non-limiting example of implementation, the data communication apparatus has a plurality of port cards implementing working ports and protection ports. A port card implementing several working ports includes a failure detector for sensing a failure in any one of the working ports. A configuration memory, containing configuration data, specifies the protection entity that protects the working ports. The failure detector constructs one or more control messages and sends the control messages to the protection entity to notify the protection entity about the failed working ports. In a specific example, the control messages identify the port card containing the protection ports. Optionally the control messages also specify, in addition to the port card, the protection ports to be used for each failed working port.

The port card with one or more protection ports includes a protection switching functional element. When the protection switching functional element receives the one or more control messages, the protection switching functional element performs a plurality of protection switching processes in parallel such as to switch data traffic from the failed working ports to the respective protection ports.

In this example, a protection switching process associated with a failed working port includes the step sending messages through a respective protection port to a remote network element to notify the remote network element to switch data traffic such that data traffic passing between the remote network element and the data communication apparatus via the failed working port is switched to the protection port. The protection switching process further includes the step of sending one or more messages to an internal component of the data communication apparatus to notify the internal component to switch the data traffic passing between the internal component and the failed working port to the protection port. The internal component can be a switch card, for example.

Under a second broad aspect, the invention provides a data communication apparatus having a plurality of port cards implementing working ports for exchanging data traffic with network elements and a plurality of protection ports. The data communication apparatus further includes a protection switching system including a plurality of protection switching functional elements residing in at least several ones of the port cards. When one or more of the working ports fail, the protection switching functional elements perform protection switching processes for switching data traffic from the one or more failed working ports to respective protection ports.

Under a third broad aspect, the invention provides a port card for a data communication apparatus. The port card has at least one working port, a port card functional element in communication with the working port and a failure detector for sensing a failure of the working port. The port card further includes a configuration memory in communication with the failure detector, the configuration memory including configuration data identifying a protection entity. When the failure detector senses a failure of the working port, the failure detector communicates with the configuration memory to extract the configuration data and use the configuration data to construct a control message for dispatch to the protection entity to notify the protection entity that the working port has failed.

Under a fourth broad aspect the invention provides a port card for a data communication apparatus having a protection port and a protection switching functional element in communication with the protection port. The protection switching functional element is responsive to a control message conveying a notification of a failure of a working port to implement a protection switching process to switch data traffic from the working port to the protection port.

Under a fifth broad aspect the invention further provides a method to perform protection switching in a data communication apparatus having a plurality of working ports for exchanging data traffic with network elements and a plurality of protection ports. The method comprises sensing when several ones of the plurality of working ports fail and perform a plurality of protection switching processes in parallel for switching data traffic from the failed working ports to respective protection ports.

BRIEF DESCRIPTION OF THE DRAWINGS

A detailed description of examples of implementation of the present invention is provided hereinbelow with reference to the following drawings, in which.

Figure 1:
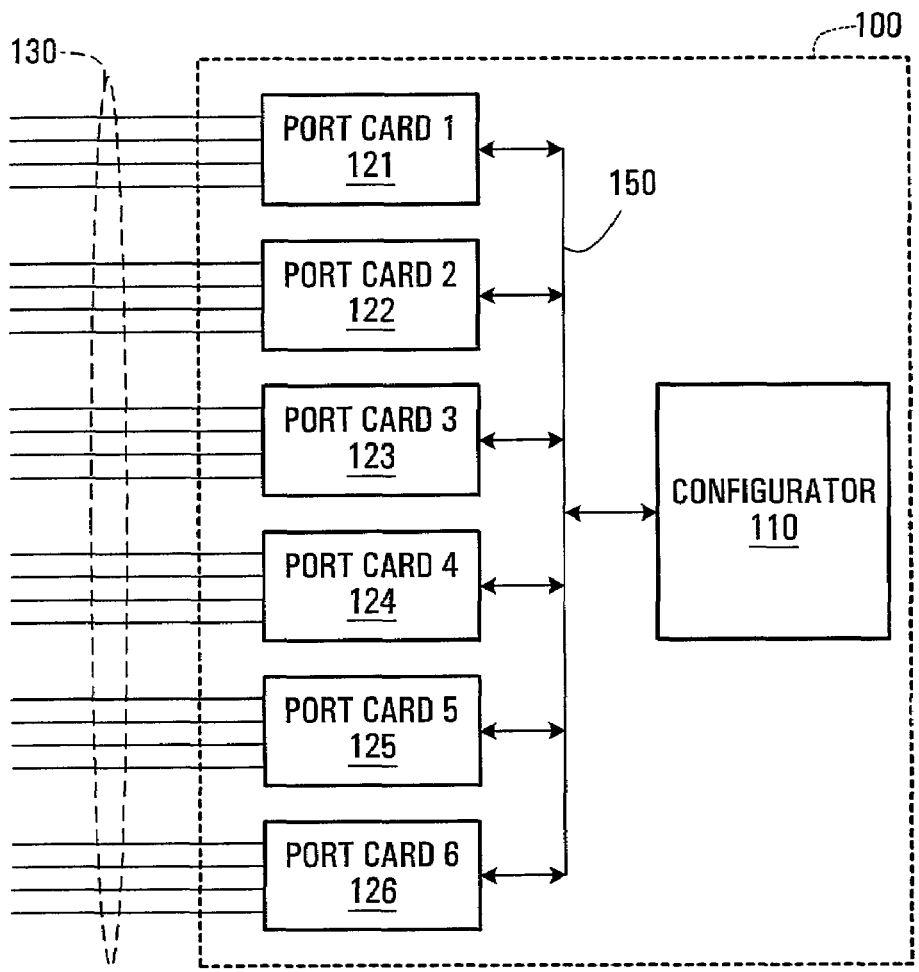
FIG. 1 is a block diagram of a data communication apparatus using a distributed protection switching system.

In the drawings, embodiments of the invention are illustrated by way of example. Whenever possible the same reference numerals have been used throughout the drawings to designate similar or identical components. It is to be expressly understood that the description and drawings are only for purposes of illustration and as an aid to understanding, and are not intended to be a definition of the limits of the invention.

DETAILED DESCRIPTION

FIG. 1 shows a data communication apparatus 100 with a distributed protection switching system. The data communication apparatus 100 may be any apparatus, such as a SONET/SDH ADM that exchanges data traffic with network elements. The data communication apparatus 100 comprises a plurality of port cards 121–126, each implementing one or more ports. Each port connects to one of a plurality of communication paths 130, which may be, for example, metallic conductors or optical fibers. FIG. 1 shows a particular implementation comprising six port cards 121–126, each port card 121–126 being connected to four communication paths 130. Therefore, each port card 121–126 implements four ports. The reader skilled in the art will readily appreciate that the telecommunication apparatus 100 may comprise any number of port cards connected to any number of communication paths.

In the example shown of FIG. 1, each port card 121–126 connects to a plurality of switch cards, which are not shown for clarity.

The data communication apparatus 100 includes a bus 150 connecting to all the port cards 121–126. The port cards 121–126 exchange control messages over the bus 150. The bus 150 also connects the port cards 121–126 to a configurator 110. Briefly, the purpose of the configurator 110 is to configure the protection switching system such that it operates according to specifications defined by the network operator. The configurator 110 is shown for clarity as a single block but this is not to be construed as a limitation. In a specific example of implementation, the configurator 110 can be a functional element, such as a program module of the maintenance system of the communication apparatus 100. Such a maintenance system allows the operator to specify through a user interface settings for the protection switching system. Examples of what those settings will be provided later.

In a possible variant, the port cards 121–126 connect to one another and to the configurator 110 via a duplicated star configuration communication infrastructure. This presents an advantage from the standpoint of reliability over the bus infrastructure described earlier that can be a single point of failure. The reader will recognize that other communication infrastructures can be used without departing from the spirit of the invention.

All the port cards 121–126 are identical from the standpoint of protection infrastructure and communication infrastructure. However, the port cards may not be identical from the standpoint of traffic carrying capacity of the ports.

Figure 2:
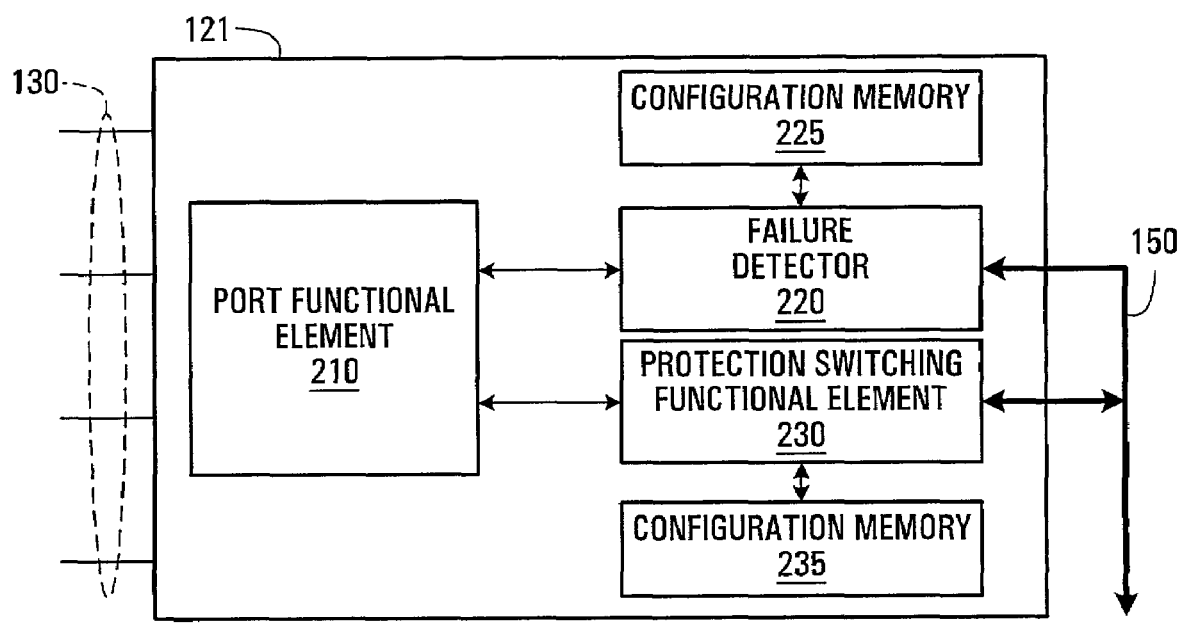
FIG. 2 is a block diagram of a port card of the data communication apparatus shown in FIG. 1.

For simplicity only port card 121 will be described, it being understood that this description also applies to the rest of the port cards 122–126. As shown in FIG. 2, the port card 121 comprises a port card functional element 210, which globally designates the various components and functions of the port card 121 in order to allow the port card 121 to exchange data traffic with network elements. Examples of such components include interfaces, receivers, transmitters, etc. These components will not be described in detail because they are conventional. Although not shown in the drawings, the port card functional element 210 communicates with the various switch cards to which the port card 121 connects. Thus, data received from a network element passes through the port card functional element 210 and it is then transferred to one or more of the switch cards. Similarly, data to be sent to a network element is delivered from one or more of the switch cards to the port card functional element 210 and then released into one or more of the ports on the port card 121.

The port card 121 further comprises a failure detector 220, which communicates with a configuration memory 225, and a protection switching functional element 230, which communicates with a configuration memory 235. The failure detector 220 designates globally the various devices and functions in the port card 121 designed to detect malfunctions, in particular failures that prevent the port card 121 to send data or receive data on one or more of its ports. Such a port failure may be caused by a failure the port card itself, a failure of the communication path 130 connected to the port, or a failure of the network element to which the port 121 leads. The configuration memory 225 contains information as to how failures detected by the failure detector 210 are to be handled. A specific example is to which port card (other than the port card 121) the failure on a certain port is to be reported such that protection switching can be made. In the case where the working ports are protected by respective protection ports residing on different port cards, the configuration memory 225 specifies all the port cards containing the protection ports associated with the failed working ports such that the failure can be reported to all the port cards containing the protection ports associated to the failed working ports.

The failure detector 220 connects to the bus 150 such that control messages can be exchanged with other port cards 122–126 and with the configurator 110. The protection switching functional element 230 designates globally the various devices and functions necessary to perform protection switching. The protection switching procedures are conducted in accordance with settings in the configuration memory 235. The protection switching functional element 230 is connected to the bus 150 such as exchange control messages with other components of the data communication apparatus 100. The protection switching functional element 230 also communicates with the port card functional element 210 such that the protection switching functional element can send control messages over any one of the ports of the port card 121 to external network elements.

Although the configuration memories 225 and 235 are shown as separate components they can be implemented as a single unit without departing from the spirit of the invention.

Referring back to FIG. 1, the ports on the port cards 121–126 fall generally in two different categories: working ports and protection ports. The working ports convey data traffic during the normal operation of the data communication apparatus 100. When one of the working ports fails, the data traffic is switched to a protection port. As indicated earlier, a failure of a working port may be caused by a failure of the internal circuitry of the port card 121–126 or by the failure of the communication path 130 to which it is connected or a failure of the network element to which the communication path 130 leads.

It is advantageous to associate each working port with a respective protection port. This provides a robust system where each working port is protected against failure. However, this is not essential to the present invention and a wide variety of working ports/protection port combinations can be used. For example, a protection port may serve a pair of working ports. If one of the working ports fails then the data traffic is switched to the protection port leaving the other working port without protection. This scheme works on a first to fail basis. Alternatively, one of the working ports may carry higher priority data traffic than the other working port. If the working port with the lower priority data traffic fails the data traffic is switched to the protection port. However if the higher priority working port subsequently fails, then the lower priority data traffic is dropped and the higher priority data traffic is switched to the protection port.

The designation of a given port as being either a protection port or a working port is user-configurable. Preferably, but not exclusively, any port may be designated as being a protection port or a working port. The configuration is done through the configurator 110. The configuration happens off-line, and once it is completed the configurator is not involved anymore in the operation of data communication apparatus 100. During the configuration operation, configuration data is generated and stored in the configuration memories 225 and 235. The configuration memory 225 stores the information regarding whether or not a given working port is protected and, if it is protected the associated protection entity; such as the port card and the protection port on that port card. The configuration memory 235 stores information regarding the details of the protection scheme to implement and the actions to take to provide the protection switching. The configuration data generally defines how the distributed protection switching system behaves when a failure occurs.

Consider for example the port card 121. The network operator may decide that the four ports of the port card 121 are all working ports and that they are all to be protected by respective protection ports that reside on the port card 124. Thus, the information loaded by the configurator 110 in the configuration memory 225 includes data specifying for each working port the protection entity, such as the corresponding protection port, and also the port card on which the protection port is located. Note that the protection ports for all the working ports on port card 121 do not have to reside all on the same port card, they can be distributed over several port cards. Although technically possible, the port card can contain both working ports and protection ports. This, however, is not recommended in particular when the protection ports protect the working ports since a failure of the port card will negate any protection switching.

In addition to specifying which ports are protection ports and which ports are working ports, the configurator 110 assists the user in determining the protection scheme to implement. The protection scheme comprises, for example, whether or not a working port is protected, a priority associated to each working port to protect by a protection port and whether or not a protection port is allowed or not to convey data traffic while not performing a protection operation, among others. The different types of protection schemes that can be implemented are known in the art and will not be described in further details.

Figure 3:
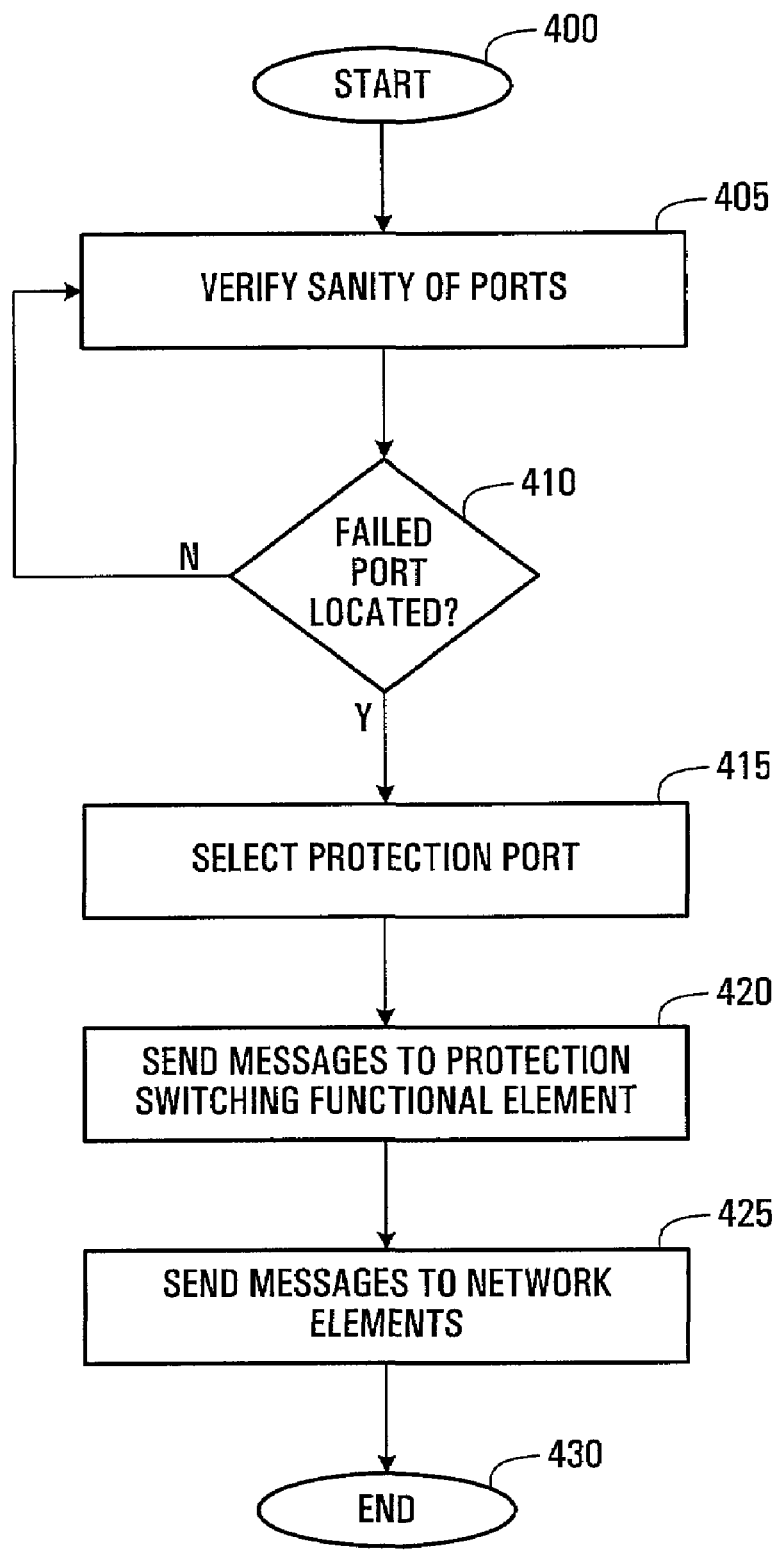
FIG. 3 is a flow chart illustrating a protection switching procedure implemented by the distributed protection switching system of the data communication apparatus shown in FIG. 1.

A flow chart of a specific example of the sequence of events when the telecommunication apparatus 100 effects protection switching is illustrated on FIG. 3.

For the sake of this example, it will be assumed that port cards 121, 122 and 123 implement only working ports and port cards 124, 125 and 126 implement only protection ports. Furthermore, a protection port is associated with each working port. In this context, the protection switching functional elements 210 in port cards 121, 122 and 123 are inoperative or not enabled.

Once the data communication apparatus 100 is in operation, with the configuration operation completed, some ports, say ports #1, #2 and #3 of port card 121, may fail at the same time or about the same time. Then, the flow of events regarding the protection switching start at step 400.

At step 405, the failure detector 220 of port card 121 is informed by the port functional element 210 of port card 121 that there is a failure on the ports #1, #2 and #3. Then, at step 410, the failure detector 220 of port card 121 consults the configuration memory 225 of port card 121 regarding which port card 121–126 to contact, if any, to effect the protection switching. In this case, port card 124 provides protection for the ports #1, #2 and #3 of port card 121 through its ports #1, #2 and #3.

At step 415, control messages are sent by the failure detector 220 of port card 121 to the protection switching element 230 of port card 124 to advise that the ports #1, #2 and #3 of port cards 121 have failed. In response to those control signals, the protection switching element 230 initiates several protection switching processes in parallel, each process being associated with a protection port. At step 420, each process communicates through its associated port with the network element to which the communication pathway 130 of the port connects, to indicate that protection switching is to be performed and waits for the network element to respond. When, through appropriate handshaking protocols, the protection switching is provisioned, the process sends control messages to the switch cards so that:

a) incoming data traffic that previously was received at the failed port will now arrive at the protection port; and b) outgoing data traffic previously sent from the failed working port should now be passed through the protection port.

It should be appreciated that the protection switching processes instituted in connection with the failed working ports are all run substantially independently from one another. The processes are run in parallel, which avoids the inherent delays associated with a sequential approach where one process must complete before another one starts. In a case where several working ports fail at the same time, the parallel protection switching approach is likely to be completed faster than the sequential approach.

For the sake of clarity, "parallel" does not necessarily mean that the processes are concurrent, in other words they start at the same time and terminate at the same time. Parallel processing occurs when one step of one process occurs at the same time that the same or different step of another process is occurring.

In the case where working ports on the port card 122 were to fail at the same time or about the same time the working ports #1, #2 and #3 on port card 121 fail, which could happen if the signals on the working ports on the port card 122 are wavelength multiplexed with the signals on the working ports on port card 121, the protection switching processes associated with the working ports on port card 122 will also happen in parallel with the protection switching processes associated with the working ports on port card 121, albeit conducted by a different protection switching functional element 230 than the protection switching functional element 230 in the case of the working ports of port card 121.

In a variant, an element outside of the port cards 121–126, say a switch card, can signal the failure if the port card itself fails. In this variant, the switch cards can also have a configuration memory and can send control signals to provide the protection to port cards 121–126 and to network elements.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A data communication apparatus, comprising: a) a plurality of working ports for exchanging data traffic with network elements; b) a plurality of protection ports; c) at least one protection switching functional element operative to perform a plurality of protection switching processes in parallel for switching data traffic from a plurality of failed working ports to respective protection ports.

2. A data communication apparatus as defined in claim 1, wherein each working port and each protection port is operative to connect to respective optical communication paths.

3. A data communication apparatus as defined in claim 1, said data communication apparatus comprising a plurality of port cards, wherein one of said protection ports being implemented on a first port card of said plurality of port cards and one of said working ports being implemented on a second port card of said plurality of port cards, and wherein the working port implemented on said second port card is a first working port and the protection port implemented on said first port card is a first protection port.

4. A data communication apparatus as defined in claim 3, wherein said first port card implements a plurality of protection ports and said second port card implements a plurality of working ports.

5. A data communication apparatus as defined in claim 3, wherein said second port card includes a failure detector for sensing a failure of the working port implemented on said second port card.

6. A data communication apparatus as defined in claim 5, wherein said failure detector communicates with said first port card to send control messages to said first port card to notify said first port card of the failure of the first working port.

7. A data communication apparatus as defined in claim 6, wherein said second port card includes a configuration memory including configuration data identifying the first protection port implemented on said first port card as a protection port over which data traffic carried by the first working port is to be switched in case of failure of the first working port.

8. A data communication apparatus as defined in claim 6, wherein said first port card includes said protection switching functional element.

9. A data communication apparatus as defined in claim 8, wherein said protection switching functional element is responsive to the control messages from said failure detector to initiate a protection switching process to switch data traffic from said first working port to said first protection port.

10. A data communication apparatus as defined in claim 9, wherein the protection switching process includes sending messages over said first protection port to a remote network element to notify the remote network element to switch data traffic such that data traffic directed by the remote network element to said first working port is redirected to said first protection port.

11. A data communication apparatus as defined in claim 10, wherein said data communication apparatus includes at least one switch card connecting to said first and to said second port cards, said protection switching process includes sending messages to said switch card to notify said switch card to switch data traffic such that data traffic directed by said switch card to said first working port is redirected to said first protection port.

12. A data communication apparatus, comprising: a) a plurality of port cards implementing working ports for exchanging data traffic with network elements and a plurality of protection ports; b) a protection switching system including a plurality of protection switching functional elements, said protection switching functional elements residing in at least several ones of said port cards, said protection switching functional elements being operative, upon one or more of said working ports failing, to perform protection switching processes in parallel for switching data traffic from the one or more failed working ports to respective protection ports.

13. A data communication apparatus, comprising: a) a plurality of working port means for exchanging data traffic with network element means; b) a plurality of protection port means; c) at least one protection switching means operative to perform a plurality of protection switching processes in parallel for switching data traffic from a plurality of failed working port means to respective protection port means.

14. A port card for a data communication apparatus, comprising: a) at least one working port; b) a port card functional element in communication with said at least one working port; c) a failure detector for sensing a failure of said at least one working port; and d) a configuration memory in communication with said failure detector, said configuration memory including configuration data identifying a protection entity wherein, upon said failure detector sensing a failure of said at least one working port, said failure detector communicates with said configuration memory to extract said configuration data and use said configuration data to construct a control message for dispatch to the protection entity to notify the protection entity that said at least one working port has failed.

15. A port card as defined in claim 14, wherein the protection entity includes a port card including a protection port, said configuration memory identifying the port card with the protection port.

16. A port card as defined in claim 14, wherein the protection entity includes a port card including a plurality of protection ports, said configuration memory identifying the port card and one protection port among the plurality of protection ports.

17. A port card for a data communication apparatus, comprising: a) a protection port; and b) a protection switching functional element in communication with said protection port, the protection switching functional element being operative to perform a plurality of protection switching processes in parallel, said protection switching functional element being responsive to a control message conveying a notification of a failure of a working port to implement a protection switching process to switch data traffic from the working port to said protection port.

18. A port card as defined in claim 17, including a configuration memory in communication with said protection switching functional element, said configuration memory including configuration data, said protection switching functional element implementing said protection switching process at least partly on a basis of said configuration data.

19. A port card as defined in claim 17, wherein said port card includes a plurality of protection ports, said protection switching functional element being responsive to one or more control messages conveying a notification of a failure of a plurality of working ports to implement a plurality of protection switching processes in parallel to switch data traffic from the failed working ports to respective protection ports of said port card.

20. A port card as defined in claim 17, wherein said protection switching process includes sending one or more messages through said protection port to a remote network entity to notify the remote network entity to switch the data traffic exchanged between the data communication apparatus and the remote network entity via the working port, to said protection port.

21. A port card as defined in claim 20 wherein said protection switching process includes sending one or more messages to an internal component of the data communication apparatus to notify the internal component to switch the data traffic exchanged between the internal component and the working port to said protection port.

22. A method for performing protection switching in a data communication apparatus, including: a) a plurality of working ports for exchanging data traffic with network elements; and b) a plurality of protection ports; said method comprising steps of: a. sensing when several ones of the plurality of working ports fail; and b. performing a plurality of protection switching processes in parallel for switching data traffic from the failed working ports to respective protection ports.

* * * * *